US012488245B2

United States Patent
Chen et al.

(10) Patent No.: US 12,488,245 B2
(45) Date of Patent: Dec. 2, 2025

(54) DATA PROCESSING

(71) Applicant: BEIJING BAIDU NETCOM SCIENCE TECHNOLOGY CO., LTD., Beijing (CN)

(72) Inventors: Xuyi Chen, Beijing (CN); Bo Ke, Beijing (CN); Chenhui Li, Beijing (CN); Zhengjie Huang, Beijing (CN); Shiwei Huang, Beijing (CN); Weibin Li, Beijing (CN); Shikun Feng, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 39 days.

(21) Appl. No.: 18/908,380

(22) Filed: Oct. 7, 2024

(65) Prior Publication Data
US 2025/0028958 A1    Jan. 23, 2025

(30) Foreign Application Priority Data
Dec. 20, 2023 (CN) .......................... 202311765827.7

(51) Int. Cl.
*G06N 3/08* (2023.01)
(52) U.S. Cl.
CPC ....................................... *G06N 3/08* (2013.01)
(58) Field of Classification Search
CPC ....................................................... G06N 3/08
See application file for complete search history.

(56) References Cited

U.S. PATENT DOCUMENTS

2020/0133257 A1*  4/2020  Cella ................. G05B 19/4183
2023/0023123 A1*  1/2023  Miyahara .............. G06N 3/065
(Continued)

FOREIGN PATENT DOCUMENTS

CN    111539195 A    8/2020
CN    116306862 A    6/2023
(Continued)

OTHER PUBLICATIONS

Chen et al. ("Decision Transformer: Reinforcement Learning via Sequence Modeling", NeurIPS 2021) (Year: 2021).*
(Continued)

*Primary Examiner* — Imad Kassim
(74) *Attorney, Agent, or Firm* — MASCHOFF BRENNAN; Liang Huang

(57) ABSTRACT

A data processing method, and a data processing model and a training method therefor are provided, and relate to the field of artificial intelligence, and specifically, to natural language processing, deep learning technologies, and large model technologies. An implementation solution includes: determining input data, where the input data includes a plurality of tokens; determining a correlation between each of the plurality of tokens and each of a plurality of expert networks based on a gating matrix, where the plurality of expert networks are used to reinforce the plurality of tokens; allocating the plurality of tokens to the plurality of expert networks in a uniform manner based on the correlation and a preset capacity of each expert network, to reinforce the plurality of tokens; and determining a data processing result based on the plurality of reinforced tokens.

16 Claims, 4 Drawing Sheets

(56) References Cited

U.S. PATENT DOCUMENTS

| | | | |
|---|---|---|---|
| 2023/0177309 A1* | 6/2023 | Clark | G06N 3/042 706/16 |
| 2023/0316042 A1* | 10/2023 | Darvish Rouhani | G06N 3/0495 706/16 |
| 2024/0273346 A1* | 8/2024 | Patel | G06N 3/098 |

FOREIGN PATENT DOCUMENTS

| | | |
|---|---|---|
| CN | 116362240 A | 6/2023 |
| CN | 116975234 A | 10/2023 |

OTHER PUBLICATIONS

Liu, et al., "A Survey on Deep Reinforcement Learning." Chinese Journal of Computers, vol. 41(1), Jan. 2018, 27 pages.

\* cited by examiner

DATA PROCESSING

This application claims priority to Chinese Patent Application No. 202311765827.7, filed on Dec. 20, 2023, the contents of which are hereby incorporated by reference in their entirety for all purposes.

TECHNICAL FIELD

The present disclosure relates to the field of artificial intelligence, and specifically, to natural language processing, deep learning technologies, and large model technologies. Specifically, the present disclosure relates to a data processing method, and a data processing model and a training method therefor, a data processing apparatus, a training apparatus, an electronic device, a computer-readable storage medium, and a computer program product.

BACKGROUND ART

Artificial intelligence is a subject on making a computer simulate some thinking processes and intelligent behaviors (such as learning, reasoning, thinking, and planning) of a human, and involves both hardware-level technologies and software-level technologies. Artificial intelligence hardware technologies generally include technologies such as sensors, dedicated artificial intelligence chips, cloud computing, distributed storage, and big data processing. Artificial intelligence software technologies mainly include the following several general directions: computer vision technologies, speech recognition technologies, natural language processing technologies, machine learning/deep learning, big data processing technologies, and knowledge graph technologies.

A pre-trained language model is a technology that has developed rapidly in the field of natural language processing in recent years. In a large model technology, a pre-trained model usually can achieve a better effect if a scale of the model is increased.

Methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY OF THE INVENTION

The present disclosure provides a data processing method, and a data processing model and a training method therefor, a data processing apparatus, a training apparatus, an electronic device, a computer-readable storage medium, and a computer program product.

According to one aspect of the present disclosure, a data processing method is provided, including: determining input data, where the input data includes a plurality of tokens; determining a correlation between each of the plurality of tokens and each of a plurality of expert networks based on a gating matrix, where the plurality of expert networks are used to reinforce the plurality of tokens; allocating the plurality of tokens to the plurality of expert networks in a uniform manner based on the correlation and a preset capacity of each expert network, to reinforce the plurality of tokens; and determining a data processing result based on the plurality of reinforced tokens.

According to another aspect of the present disclosure, a data processing model is provided, including: a routing layer configured to determine a correlation between each of a plurality of tokens in input data and each of a plurality of expert networks based on a gating matrix, where the correlation is used to allocate the plurality of tokens to the plurality of expert networks in a uniform manner with reference to a preset capacity of each expert network; an expert network layer including a plurality of expert networks, where the expert network is used to reinforce an allocated token; and an output layer configured to determine a data processing result based on the plurality of reinforced tokens.

According to another aspect of the present disclosure, a method for training a data processing model is provided, including: determining a sample input, where the sample input includes a plurality of tokens; determining a correlation between each of the plurality of tokens and each of a plurality of expert networks based on a gating matrix, where the plurality of expert networks are used to reinforce the plurality of tokens, and the correlation is used to allocate the plurality of tokens to the plurality of expert networks in a uniform manner with reference to a preset capacity of each expert network; determining a loss value based on the gating matrix, where greater resemblance of the gating matrix to an orthogonal matrix leads to a smaller loss value; and adjusting a parameter of the gating matrix based on the loss value, to obtain a trained data processing model.

According to another aspect of the present disclosure, a data processing apparatus is provided, including: an input unit configured to determine input data, where the input data includes a plurality of tokens; a correlation determining unit configured to determine a correlation between each of the plurality of tokens and each of a plurality of expert networks based on a gating matrix, where the plurality of expert networks are used to reinforce the plurality of tokens; an allocation unit configured to allocate the plurality of tokens to the plurality of expert networks in a uniform manner based on the correlation and a preset capacity of each expert network, to reinforce the plurality of tokens; and an output unit configured to determine a data processing result based on the plurality of reinforced tokens.

According to another aspect of the present disclosure, an apparatus for training a data processing model is provided, including: an input unit configured to determine a sample input, where the sample input includes a plurality of tokens; a correlation determining unit configured to determine a correlation between each of the plurality of tokens and each of a plurality of expert networks based on a gating matrix, where the plurality of expert networks are used to reinforce the plurality of tokens, and the correlation is used to allocate the plurality of tokens to the plurality of expert networks in a uniform manner with reference to a preset capacity of each expert network; a loss determining unit configured to determine a loss value based on the gating matrix, where greater resemblance of the gating matrix to an orthogonal matrix leads to a smaller loss value; and a parameter adjustment unit configured to adjust a parameter of the gating matrix based on the loss value, to obtain a trained data processing model.

According to another aspect of the present disclosure, an electronic device is provided, including: at least one processor; and a memory communicatively connected to the at least one processor, where the memory stores instructions executable by the at least one processor, and the instructions, when executed by the at least one processor, cause the at least one processor to perform the method provided in the present disclosure.

According to another aspect of the present disclosure, a non-transitory computer-readable storage medium storing computer instructions is provided, where the computer instructions are used to cause a computer to perform the method provided in the present disclosure.

According to another aspect of the present disclosure, a computer program product is provided, including a computer program, where when the computer program is executed by a processor, the method provided in the present disclosure is implemented.

According to one or more embodiments of the present disclosure, when data processing tasks are being allocated to the plurality of expert networks, a constraint of uniform allocation may be also met while optimal allocation is considered, so that each expert network can play a role in a data processing process, thereby improving data processing efficiency.

It should be understood that the content described in this section is not intended to identify critical or important features of the embodiments of the present disclosure, and is not used to limit the scope of the present disclosure. Other features of the present disclosure will be readily understood with reference to the following description.

BRIEF DESCRIPTION OF THE DRAWINGS

The accompanying drawings show example embodiments and form a part of the specification, and are used to explain example implementations of the embodiments together with a written description of the specification. The embodiments shown are merely for illustrative purposes and do not limit the scope of the claims. Throughout the accompanying drawings, the same reference numerals denote similar but not necessarily same elements.

DETAILED DESCRIPTION OF EMBODIMENTS

Example embodiments of the present disclosure are described below in conjunction with the accompanying drawings, where various details of the embodiments of the present disclosure are included to facilitate understanding, and should only be considered as example. Therefore, those of ordinary skill in the art should be aware that various changes and modifications can be made to the embodiments described herein, without departing from the scope of the present disclosure. Likewise, for clarity and conciseness, the description of well-known functions and structures is omitted in the following description.

In the present disclosure, unless otherwise stated, the terms "first", "second", etc., used to describe various elements are not intended to limit the positional, temporal or importance relationship of these elements, but rather only to distinguish one element from the other. In some examples, a first element and a second element may refer to a same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed terms.

The embodiments of the present disclosure will be described below in detail with reference to the accompanying drawings.

Figure 1:
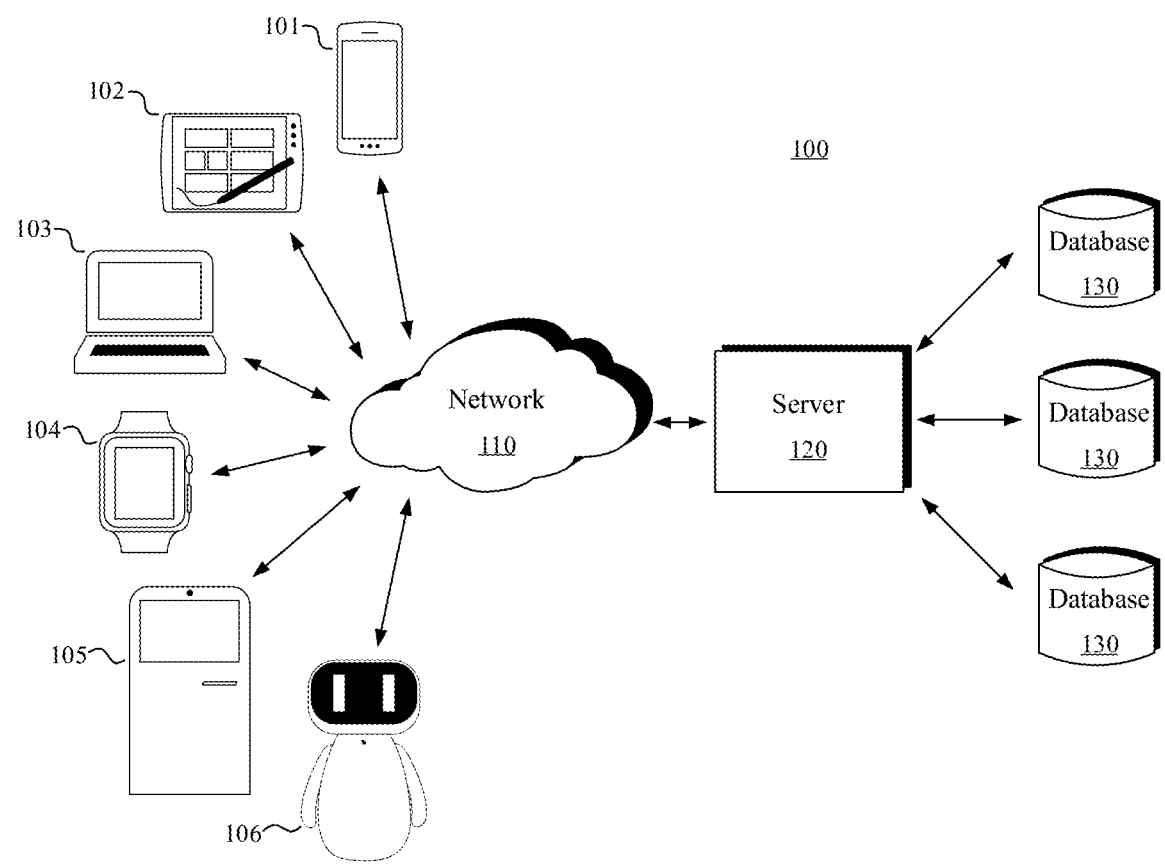
FIG. 1 is a schematic diagram of an example system in which various methods described herein can be implemented, according to an embodiment of the present disclosure.

FIG. 1 is a schematic diagram of an example system 100 in which various methods and apparatuses described herein can be implemented according to an embodiment of the present disclosure. Referring to FIG. 1, the system 100 includes one or more client devices 101, 102, 103, 104, 105, and 106, a server 120, and one or more communication networks 110 that couple the one or more client devices to the server 120. The client devices 101, 102, 103, 104, 105, and 106 may be configured to execute one or more applications.

In an embodiment of the present disclosure, the server 120 can run one or more services or software applications that enable a method of the embodiments in the present disclosure to be performed.

In some embodiments, the server 120 may further provide other services or software applications that may include a non-virtual environment and a virtual environment. In some embodiments, these services may be provided as web-based services or cloud services, for example, provided to a user of the client devices 101, 102, 103, 104, 105, and/or 106 in a software as a service (SaaS) model.

In the configuration shown in FIG. 1, the server 120 may include one or more components that implement functions performed by the server 120. These components may include software components, hardware components, or a combination thereof that can be executed by one or more processors. The user operating the client devices 101, 102, 103, 104, 105, and/or 106 may sequentially use one or more client applications to interact with the server 120, to use the services provided by these components. It should be understood that various different system configurations are possible, and may be different from that of the system 100. Therefore, FIG. 1 is an example of the system for implementing various methods described herein, and is not intended to be limiting.

The user may use the client devices 101, 102, 103, 104, 105 and/or 106 to obtain data processed according to the method in the embodiments of the present disclosure. The client device may provide an interface that enables the user of the client device to interact with the client device. The client device may also output information to the user via the interface. Although FIG. 1 shows only six client devices, those skilled in the art will understand that any number of client devices are supported in the present disclosure.

The client devices 101, 102, 103, 104, 105, and/or 106 may include various types of computer devices, such as a portable handheld device, a general-purpose computer (such as a personal computer and a laptop computer), a workstation computer, a wearable device, a smart screen device, a self-service terminal device, a service robot, a gaming system, a thin client, various messaging devices, and a sensor or other sensing devices. These computer devices can run various types and versions of software applications and operating systems, such as MICROSOFT Windows, APPLE IOS, a UNIX-like operating system, and a Linux or Linux-like operating system (e.g., GOOGLE Chrome OS); or include various mobile operating systems, such as MICROSOFT Windows Mobile OS, iOS, Windows Phone, and Android. The portable handheld device may include a cellular phone, a smartphone, a tablet computer, a personal digital assistant (PDA), etc. The wearable device may include a head-mounted display (such as smart glasses) and other devices. The gaming system may include various handheld gaming devices, Internet-enabled gaming devices, etc. The client device can execute various applications, such as various Internet-related applications, communication applications (e.g., email applications), and short message service (SMS) applications, and can use various communication protocols.

The network 110 may be any type of network well known to those skilled in the art, and may use any one of a plurality of available protocols (including but not limited to TCP/IP, SNA, IPX, etc.) to support data communication. As a mere example, the one or more networks 110 may be a local area network (LAN), an Ethernet-based network, a token ring, a wide area network (WAN), the Internet, a virtual network, a virtual private network (VPN), an intranet, an extranet, a blockchain network, a public switched telephone network (PSTN), an infrared network, a wireless network (such as Bluetooth or Wi-Fi), and/or any combination of these and/or other networks.

The server 120 may include one or more general-purpose computers, a dedicated server computer (for example, a personal computer (PC) server, a UNIX server, or a terminal server), a blade server, a mainframe computer, a server cluster, or any other suitable arrangement and/or combination. The server 120 may include one or more virtual machines running a virtual operating system, or other computing architectures related to virtualization (e.g., one or more flexible pools of logical storage devices that can be virtualized to maintain virtual storage devices of a server). In various embodiments, the server 120 can run one or more services or software applications that provide functions described below.

A computing unit in the server 120 can run one or more operating systems including any of the above operating systems and any commercially available server operating system. The server 120 can also run any one of various additional server applications and/or middle-tier applications, including an HTTP server, an FTP server, a CGI server, a JAVA server, a database server, etc.

In some implementations, the server 120 may include one or more applications to analyze and merge data feeds and/or event updates received from the user of the client devices 101, 102, 103, 104, 105, and/or 106. The server 120 may further include one or more applications to display the data feeds and/or real-time events via one or more display devices of the client devices 101, 102, 103, 104, 105, and/or 106.

In some implementations, the server 120 may be a server in a distributed system, or a server combined with a blockchain. The server 120 may alternatively be a cloud server, or an intelligent cloud computing server or intelligent cloud host with artificial intelligence technologies. The cloud server is a host product in a cloud computing service system, to overcome the shortcomings of difficult management and weak service scalability in conventional physical host and virtual private server (VPS) services.

The system 100 may further include one or more databases 130. In some embodiments, these databases can be used to store data and other information. For example, one or more of the databases 130 can be configured to store information such as an audio file and a video file. The databases 130 may reside in various locations. For example, a database used by the server 120 may be locally in the server 120, or may be remote from the server 120 and may communicate with the server 120 via a network-based or dedicated connection. The database 130 may be of different types. In some embodiments, the database used by the server 120 may be, for example, a relational database. One or more of these databases can store, update, and retrieve data from or to the database, in response to a command.

In some embodiments, one or more of the databases 130 may also be used by an application to store application data. The database used by the application may be of different types, for example, may be a key-value repository, an object repository, or a regular repository backed by a file system.

The system 100 of FIG. 1 may be configured and operated in various manners, such that the various methods and apparatuses described according to the present disclosure can be applied.

Figure 2:
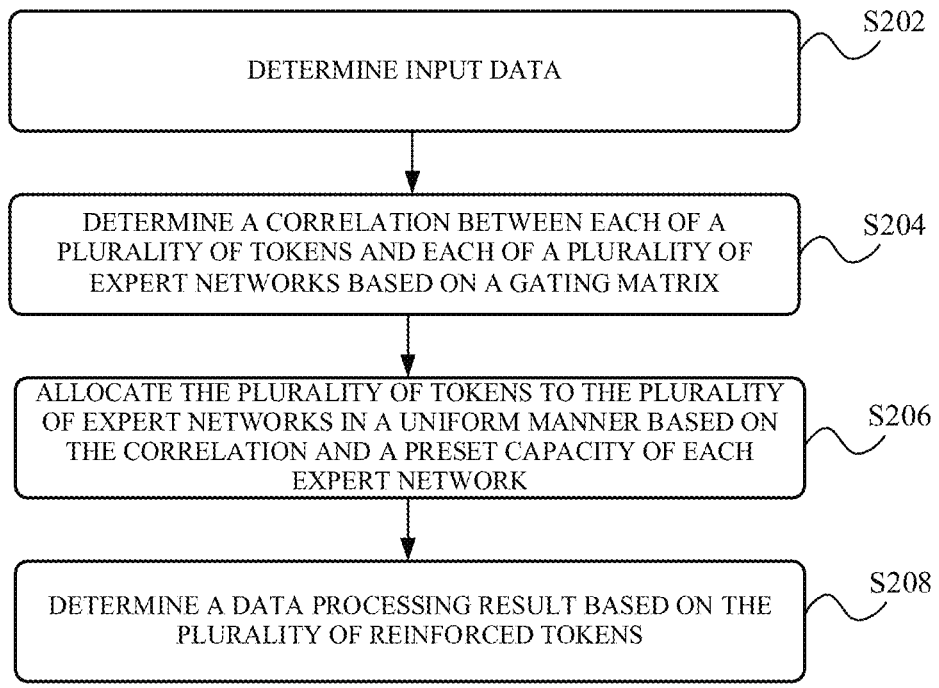
FIG. 2 shows an example process of a data processing method according to an embodiment of the present disclosure.

FIG. 2 shows an example process of a data processing method according to an embodiment of the present disclosure.

As shown in FIG. 2, in step S202, input data may be determined, where the input data includes a plurality of tokens.

In step S204, a correlation between each of the plurality of tokens and each of a plurality of expert networks may be determined based on a gating matrix. The plurality of expert networks are used to reinforce the plurality of tokens.

In step S206, the plurality of tokens may be allocated to the plurality of expert networks in a uniform manner based on the correlation and a preset capacity of each expert network, to reinforce the plurality of tokens.

In step S208, a data processing result may be determined based on the plurality of reinforced tokens.

In this embodiment of the present disclosure, when data processing tasks are being allocated to the plurality of expert networks, a constraint of uniform allocation may be also met while optimal allocation is considered, so that each expert network can play a role in a data processing process, thereby improving data processing efficiency.

Principles of the present disclosure are described in detail below.

A Transformer model is a neural network model based on an attention mechanism, and is mainly used for natural language processing (NLP) tasks, such as language translation and text classification. A Transformer structure is widely applied to the field of natural language processing. The Transformer model mainly includes two parts: an encoder and a decoder. The encoder converts an input sequence into a vector representation with a fixed length, and the decoder converts the vector into an output sequence. There are one or more attention mechanism layers between the encoder and the decoder for capturing a correlation between the input sequence and the output sequence. Specifically, the Transformer model mainly includes a plurality of Transformer layers, and each Transformer layer includes two main parts: a self-attention layer and a feed-forward network (FFN). A self-attention mechanism is a method for calculating a correlation between each word and each of other words and considering the correlations together. In this method, a relationship between elements in the input sequence can be captured, regardless of a distance between the elements in the sequence. In the Transformer model, the self-attention mechanism is used to calculate an effect exerted by each element in the input sequence or the output sequence on another element. A feed-forward neural network is a neural network based on a fully connected layer, and is used to perform nonlinear transformation on the input sequence. In the Transformer model, the FFN may include two fully connected layers.

A large quantity of matrix multiplications are commonly used in a current Transformer network structure, so that a network parameter quantity is directly proportional to a quantity of matrix operations. This causes the following series of problems in actual application:

1. Computational complexity is high. A structure of a Transformer-based model is complex and includes a large quantity of matrix multiplications and attention mechanism computation, resulting in long computation and training time. This is an important bottleneck for a large-scale data set and real-time application.
2. Resource consumption is high. Due to the high computational complexity of the Transformer-based model, a large number of computing resources, including a GPU, a TPU, and the like, are required for training and reasoning processes of the Transformer-based model. This is a challenge for an environment with limited resources.
3. A capability of processing long sequences is limited. The Transformer-based model performs well when processing short-sequence data, but may encounter a problem of performance degradation when processing long-sequence data. This is mainly because a large number of attention scores need to be computed during processing of a long sequence in the self-attention mechanism of the model, resulting in reduced computational efficiency.

It can be learned that the Transformer network structure requires a large number of parameters to achieve an optimal effect. Multiplying a quantity of parameters of the model means multiplying computing resources for a conventional structure.

A data processing model in the present disclosure relates to a mix of experts (MoE) network in a large-scale pre-trained model (for example, a large model or a large language model). In short, the MoE model increases a quantity of feed-forward network (FFN) modules in the Transformer structure, and each feed-forward network serves as an expert. In a data processing process, different tokens (also referred to as tokens or symbols, token) input into the model are selectively distributed to different experts for computation, to reinforce the tokens (for example, a feature vector representing the tokens). In this manner, the quantity of parameters of the model can be increased (for example, when Z experts are set, parameters of the FFN module may be increased by Z times), but an operation amount is equal to an original operation amount.

An advantage of the mix of experts network is that the mix of experts network can implement decoupling between computation and a storage volume, which means that computing resources and a storage capacity can be independently expanded and optimized. This feature enables the mix of experts network provided in this embodiment of the present disclosure to accommodate more parameters of the model within limited computing resources, thereby improving an expression capability and performance of the model. In this decoupling design, allocation of computing and storage resources can be further flexibly adjusted according to an actual requirement to achieve optimal performance and efficiency. Therefore, the mix of experts network provided in this embodiment of the present disclosure provides an effective solution for efficient utilization of computing resources, and in particular, can leverage greater advantages in a resource-limited environment.

In step S202, the input data may be determined, where the input data includes a plurality of tokens.

In an example of text processing, a natural language input may be processed by using a text tokenization algorithm to obtain a plurality of corresponding tokens. The tokens in the input data may include a token corresponding to a character or a word in input text, or may include a token corresponding to a special symbol. The special symbol may include, for example, a start-of-sentence symbol [CLS] or a symbol [September] segmenting different sentences or located at an end of a sentence.

When the Transformer-based network structure is used in another data processing field, the token may correspondingly represent a segment of data obtained through segmentation of other data (for example, an image).

In step S204, the correlation between each of the plurality of tokens and each of the plurality of expert networks may be determined based on the gating matrix. The plurality of expert networks are used to reinforce the plurality of tokens.

In the MoE model, a routing module is used to distribute input tokens to corresponding expert networks. The routing module is equivalent to a step of projection, and a vector representation of the input tokens is projected into the expert networks. The routing module may be represented as formula (1):

$$\text{gate} = \text{softmax}(\text{Linear}(X)) \qquad (1)$$

where X represents the input data, Linear represents a function of linear mapping, and softmax represents normalization of a result of the linear mapping. A result output by the routing module may be used to represent the correlation between each token and each of the plurality of expert networks.

For example, the routing module may be implemented by a gating matrix $W \in \mathbb{R}^{d \times e}$, d is a dimension of the tokens (for example, a feature vector representing the tokens), and e is a quantity of expert networks. A vector in the gating matrix represents a learnable parameter of each expert network. The correlation between each token and each expert network may be calculated by using the gating matrix. In some examples, the correlation between each of the plurality of expert networks and each of the plurality of tokens may be determined based on a product of the input data (a vector representation including the plurality of tokens) and the gating matrix. The gating matrix makes it convenient to determine the correlation between each input token and each expert network. In an example of the gating matrix, the routing module may be represented as formula (2):

$$gate = softmax(W \cdot X) \quad (2)$$

where X represents the input data, and W represents the gating matrix.

In step S206, the plurality of tokens may be allocated to the plurality of expert networks in the uniform manner based on the correlation and the preset capacity of each expert network, to reinforce the plurality of tokens.

In the related art, in each forward process of a network, a token is processed by an expert network that has a highest correlation with the token and that is determined in the routing module. However, a "model collapse" condition may occur based on such an allocation manner, which is characterized in that the model tends to use only one or two of a plurality of newly introduced "experts", and consequently, remaining "expert" networks cannot be effectively trained or used, and a prediction effect of the network cannot be effectively improved. In the related art, an auxiliary loss function is used for guidance, so that each "expert" network has the potential to be trained. The auxiliary loss function is usually in a form of formula (3):

$$L_{aux} = \text{Entropy(gate)} \quad (3)$$

Prediction results of the routing module are guided to be uniform by increasing an entropy of a gating part used for prediction. However, even with the guidance of the auxiliary loss function, in actual network operation, the plurality of tokens need to be scored and predicted in parallel to ensure high computational performance. When several tokens are routed in parallel, a "clustering" phenomenon occurs, which is characterized in that quantities of tokens obtained by the "experts" are nonuniform. For contemporary computing hardware, such inconsistency leads to low computational efficiency.

To solve the above problem, in the present disclosure, the plurality of tokens are allocated to different expert networks in a uniform allocation manner, so that all the expert networks use computing resources in a uniform manner, thereby improving computational efficiency.

A predetermined capacity of each expert network may be determined based on a quantity of tokens included in the input data and the quantity of expert networks, that is, a quantity of tokens that can be processed by each expert network. For example, the predetermined capacity of each expert network may be determined as M/e, where M is the quantity of tokens in the input data, and e is the quantity of expert networks. In some examples, a result of M/e may be rounded up or rounded down to determine the predetermined capacity of each expert network. Each time a token is allocated to an expert network, a part of a capacity of the expert network is occupied.

In some embodiments, for each token, an expert network having a highest correlation with the token may be determined using the correlation determined based on the gating matrix. When a remaining capacity of the expert network having the highest correlation is not zero, the token may be allocated to the expert network with the remaining capacity. Correlation calculation may be successively performed on the plurality of tokens, and the plurality of tokens are allocated to the expert networks.

In some other embodiments, the plurality of tokens may be allocated for a plurality of times. Each time of allocation enables the expert networks to reinforce the plurality of input tokens once. An amount of computation performed by the networks for the input tokens may be adjusted by setting a quantity of allocation times. It can be learned that computing resources that need to be occupied by the data processing model provided in this embodiment of the present disclosure are determined based on a quantity of input tokens and a quantity of times of processing the tokens by the expert networks, while a quantity of parameters to be stored in the data processing model is determined based on the quantity of expert networks. There is no correlation between the two. Therefore, calculation can be decoupled from the storage volume.

When allocation is performed for a plurality of times, in some allocation schemes, each token is allocated to an expert network having a highest correlation with the token, and in some other allocation schemes, a constraint is added to enable a final allocation result to be uniform allocation.

For example, the plurality of tokens may be allocated twice. During the first time of allocation, each token may be allocated to an expert network having a highest correlation with the token. During the second time of allocation, each token is allocated to the expert network having the highest correlation as much as possible under the constraint of uniform allocation. As results of the two times of allocation, quantities of tokens processed by the expert networks are basically the same. Therefore, uniform allocation of computing resources can be implemented. In some examples, uniform allocation may be implemented based on an optimal transport algorithm.

The optimal transport algorithm is an algorithm used to solve a transport problem in the field of mathematics and optimization. In a most basic form, the optimal transport algorithm involves how to move an object from a set of positions to another set of positions at the minimum costs. This problem has many variations in practical application, including logistics, image processing, machine learning, and other fields. In the optimal transport algorithm, there is usually a "costs matrix" in which each element represents costs for moving from one position to another position. An objective of the algorithm is to find a transport solution. The solution meets all requirements and supply constraints while minimizing total transport costs. To solve this problem, the optimal transport algorithm is usually combined with mathematical tools such as linear programming and a graph theory. For large-scale problems, more efficient computing techniques and optimization methods further need to be used. In the context of machine learning and deep learning, the optimal transport algorithm is already used as a tool to improve performance of the model, especially when alignment, matching, or transfer learning in data distribution is involved. The optimal transport algorithm can help establish a better correspondence between different data sets, thereby improving a generalization capability of the model. Efficient and cost-effective resource allocation and transmission solutions can be implemented in various application scenarios by using the optimal transport algorithm.

In this embodiment of the present disclosure, a token allocation problem may be converted into a transport problem, so that the tokens can be allocated to the expert networks in the uniform manner by using the optimal transport algorithm.

In some examples, step S206 may include: determining a first allocation scheme based on the correlation, where in the first allocation scheme, each token is allocated to an expert network having a highest correlation with the token; determining a remaining capacity of each expert network based on the first allocation scheme and the preset capacity of each expert network; and determining a second allocation scheme based on the correlation and the remaining capacity of each expert network, where the second allocation scheme is combined with the first allocation scheme to allocate the plurality of tokens to the plurality of expert networks in the uniform manner. For example, the second allocation scheme may be determined based on the optimal transport algorithm and based on the correlation and the remaining capacity of each expert network. In an example, the optimal transport algorithm may be a sinkhorn algorithm or any other suitable optimal transport algorithm. The sinkhorn algorithm may meet the constraint of uniform allocation while taking costs (the correlation between the token and the expert network) into account. Efficient implementation may be performed on acceleration hardware such as a GPU by using the sinkhorn algorithm. A process of allocating the tokens to the expert networks is converted into an optimal transport problem, and with the use of the optimal transport algorithm, the uniformity of transport results can be ensured while each token is enabled to select an expert that has a highest correlation with the token as much as possible, so that the experts process a same (or basically same) quantity of tokens, thereby achieving optimal computational efficiency.

In some examples, all the expert networks may have a same preset capacity. When allocation is performed for a plurality of times, the preset capacity of each expert network may be determined based on $(N \times M)/e$. N represents the quantity of allocation times, M is the quantity of tokens in the input data, and e is the quantity of expert networks.

In step S208, the data processing result may be determined based on the plurality of reinforced tokens. For example, the expert network implements a function of the FFN in the Transformer network structure. After the allocated token is reinforced by the expert network, the reinforced token may be input into a next layer of the network, for example, the self-attention layer. In some examples, step S208 may include: processing the plurality of reinforced tokens based on a self-attention mechanism, to obtain the data processing result.

Figure 3:
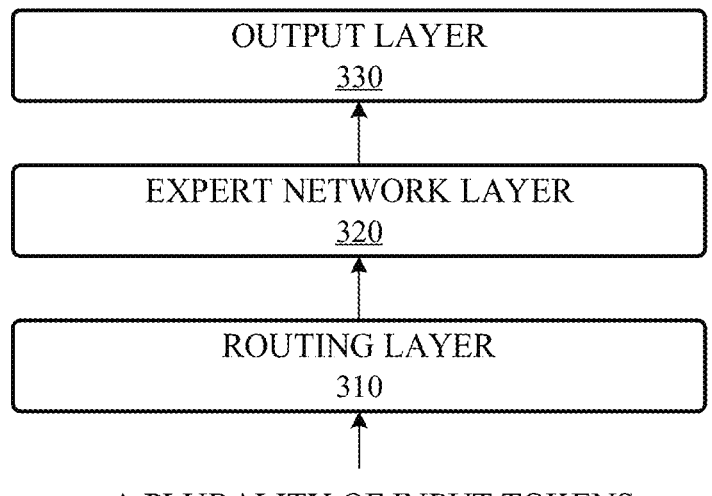
FIG. 3 is an example block diagram of a data processing model according to an embodiment of the present disclosure.

FIG. 3 is an example block diagram of a data processing model according to an embodiment of the present disclosure. The data processing method described in FIG. 2 may be implemented by using the data processing model shown in FIG. 3. The data processing model described with reference to FIG. 3 may be a deep neural network or any other mathematical model consistent with the principles of the present disclosure. A structure of the data processing model shown in FIG. 3 may be used in a large model (for example, a large language model).

As shown in FIG. 3, the data processing model may include a routing layer 310, an expert network layer 320 including a plurality of expert networks, and an output layer 330.

The routing layer 310 may be configured to determine a correlation between each of a plurality of tokens in input data and each of a plurality of expert networks based on a gating matrix, where the correlation is used to allocate the plurality of tokens to the plurality of expert networks in a uniform manner with reference to a preset capacity of each expert network.

The expert network in the expert network layer 320 may be configured to reinforce an allocated token.

The output layer 330 may be configured to determine a data processing result based on the plurality of reinforced tokens.

In some embodiments, that a correlation between each of the plurality of tokens and each of a plurality of expert networks may be determined based on a gating matrix may include: determining the correlation between each of the plurality of expert networks and each of the plurality of tokens based on a product of the input data and the gating matrix.

In some embodiments, that the plurality of tokens may be allocated to the plurality of expert networks in a uniform manner may include: determining a first allocation scheme based on the correlation, where in the first allocation scheme, each token is allocated to an expert network having a highest correlation with the token; determining a remaining capacity of each expert network based on the first allocation scheme and the preset capacity of each expert network; and determining a second allocation scheme based on the correlation and the remaining capacity of each expert network, where the second allocation scheme is combined with the first allocation scheme to allocate the plurality of tokens to the plurality of expert networks in the uniform manner.

In some embodiments, all the expert networks may have a same preset capacity.

In some embodiments, the determining a second allocation scheme based on the correlation and the remaining capacity of each expert network may include: determining the second allocation scheme based on an optimal transport algorithm and based on the correlation and the remaining capacity of the expert network.

In some embodiments, the optimal transport algorithm may be a sinkhorn algorithm.

In some embodiments, the output layer may be configured to: process the plurality of reinforced tokens based on a self-attention mechanism, to obtain the data processing result.

Figure 4:
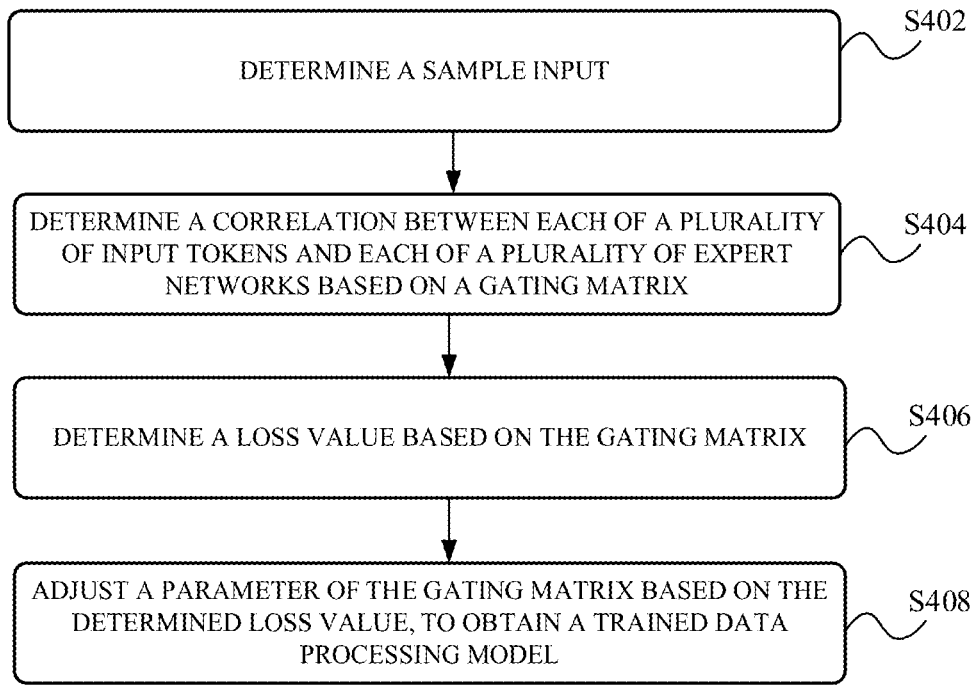
FIG. 4 is an example flowchart of a method for training a data processing model according to an embodiment of the present disclosure.

FIG. 4 is an example flowchart of a method for training a data processing model according to an embodiment of the present disclosure. The data processing model described with reference to FIG. 3 may be trained by using the method shown in FIG. 4.

In step S402, a sample input may be determined, where the sample input includes a plurality of tokens. Content of the sample input may be selected from a pre-determined training data set.

In step S404, a correlation between each of the plurality of input tokens and each of a plurality of expert networks may be determined based on a gating matrix. The plurality of expert networks are used to reinforce the plurality of tokens. The correlation determined in step S204 may be used to allocate the plurality of tokens to the plurality of expert networks in a uniform manner with reference to a preset capacity of each expert network. All the expert networks may have a same preset capacity, and the preset capacity of each expert network may be determined by using the method described with reference to FIG. 2 in the present disclosure.

In step S406, a loss value may be determined based on the gating matrix. Greater resemblance of the gating matrix to an orthogonal matrix leads to a smaller loss value. In some embodiments, the loss value may be designed based on a feature of the orthogonal matrix. One of features of the orthogonal matrix is that a product of the orthogonal matrix and a transposed matrix of the orthogonal matrix is a unit matrix. Therefore, a product of the gating matrix and a transposed matrix of the gating matrix may be determined, and the loss value is determined based on an error between the product and the unit matrix. For example, the loss value may be determined based on formula (4):

$$L_{orth} = MSE(W \cdot W^T, I) \qquad (4)$$

$L_{orth}$ represents the loss value, MSE represents a minimum mean square error, W represents the gating matrix, $W^T$ represents the transposed matrix of the gating matrix, and I represents the unit matrix. It may be understood that, although the MSE is used as an example in formula (4) to describe a manner of calculating the loss value, another form of counting statistics of the error may be alternatively used to determine the loss value without deviating from the principles of the present disclosure.

In step S408, a parameter of the gating matrix may be adjusted based on the loss value determined in step S406, to obtain a trained data processing model.

In the model training method provided in this embodiment of the present disclosure, the loss value may be set, so that vectors that correspond to the expert networks and that are in the gating matrix representing trainable parameters of the expert networks in the trained data processing model are (nearly) orthogonal to each other. In this way, the expert networks can reinforce the tokens in different manners. When the gating matrix is close to the orthogonal matrix, the expert networks are related to the tokens in different manners, so that the expert networks tend to select different tokens, thereby avoiding a case in which some tokens are omitted because the expert networks tend to select a same token when the tokens are allocated to the expert networks.

Figure 5A:
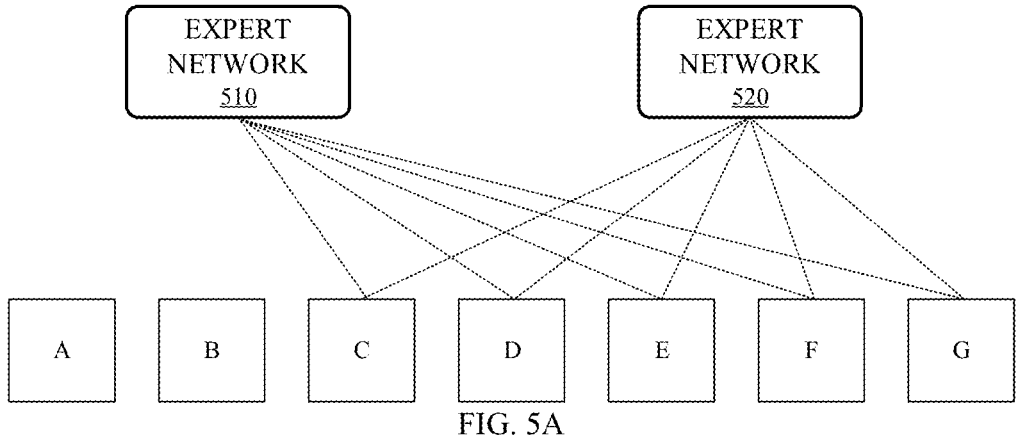
FIG. 5A shows an example of a data processing process in the related art.

FIG. 5A shows an example of a data processing process in the related art. In the example shown in FIG. 5A, there is a homogenization phenomenon among parameters of a routing module. Specifically, dot product angles between vectors for expert networks in a gating matrix are relatively close to each other, as shown in formula (5):

$$W_i \cdot W_j \to 1, \forall i, j \in D \qquad (5)$$

$W_i$ and $W_j$ respectively represent vectors for an $i^{th}$ expert network and a $j^{th}$ expert network in the gating matrix, and D represents an index set of the expert networks.

In the example shown in FIG. 5A, due to the existence of the homogenization phenomenon, different expert networks 510 and 520 tend to select same tokens (such as C, D, E, F, and G) for processing, resulting in some tokens (A and B) being omitted and unable to be processed.

Figure 5B:
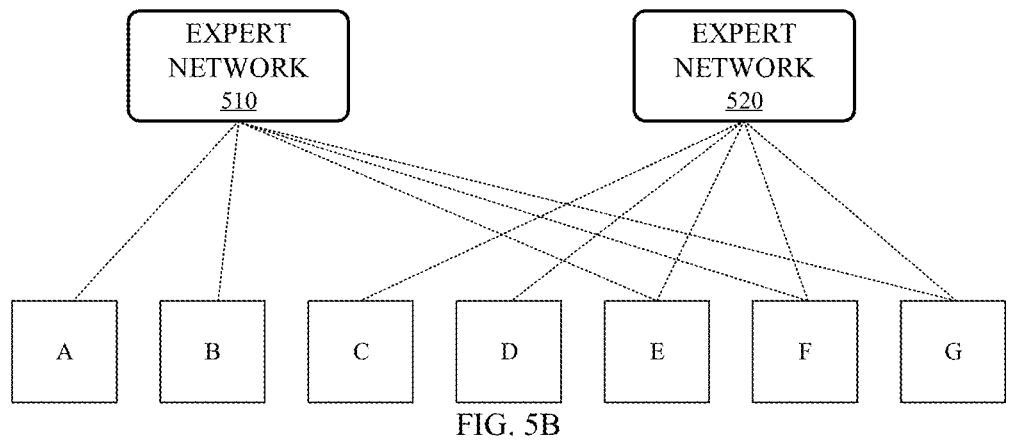
FIG. 5B shows an example of a data processing process according to an embodiment of the present disclosure.

FIG. 5B shows an example of a data processing process according to an embodiment of the present disclosure. Because vectors for expert networks in a gating matrix of a data processing model trained by using the training method described with reference to FIG. 4 tend to be orthogonal, different expert networks can select different tokens for processing, thereby avoiding the homogenization problem in FIG. 5A.

Figure 6:
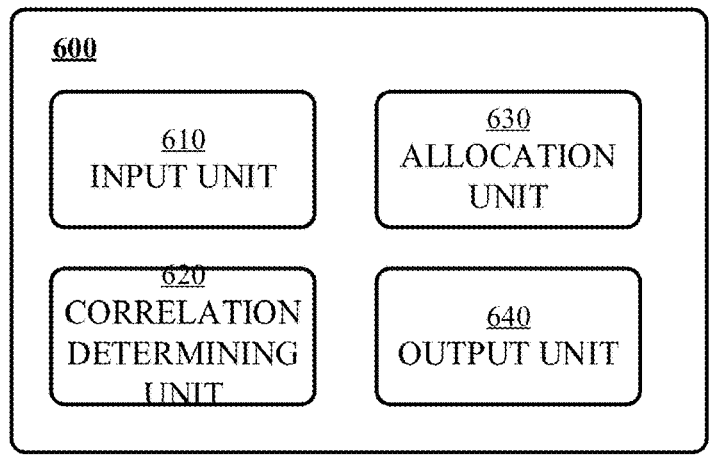
FIG. 6 is an example block diagram of a data processing apparatus according to an embodiment of the present disclosure.

FIG. 6 is an example block diagram of a data processing apparatus according to an embodiment of the present disclosure. As shown in FIG. 6, the data processing apparatus 600 may include an input unit 610, a correlation determining unit 620, an allocation unit 630, and an output unit 640. The data processing method described with reference to FIG. 2 may be performed by the data processing apparatus described in FIG. 6.

The input unit 610 may be configured to determine input data, where the input data includes a plurality of tokens.

The correlation determining unit 620 may be configured to determine a correlation between each of the plurality of tokens and each of a plurality of expert networks based on a gating matrix, where the plurality of expert networks are used to reinforce the plurality of tokens.

The allocation unit 630 may be configured to allocate the plurality of tokens to the plurality of expert networks in a uniform manner based on the correlation and a preset capacity of each expert network, to reinforce the plurality of tokens.

The output unit 640 may be configured to determine a data processing result based on the plurality of reinforced tokens.

In some embodiments, the correlation determining unit is configured to: determine the correlation between each of the plurality of expert networks and each of the plurality of tokens based on a product of the input data and the gating matrix.

In some embodiments, allocating the plurality of tokens to the plurality of expert networks in the uniform manner based on the correlation and the preset capacity of each expert network may include: determining a first allocation scheme based on the correlation, where in the first allocation scheme, each token is allocated to an expert network having a highest correlation with the token; determining a remaining capacity of each expert network based on the first allocation scheme and the preset capacity of each expert network; and determining a second allocation scheme based on the correlation and the remaining capacity of each expert network, where the second allocation scheme is combined with the first allocation scheme to allocate the plurality of tokens to the plurality of expert networks in the uniform manner.

In some embodiments, all the expert networks may have a same preset capacity.

In some embodiments, the determining a second allocation scheme based on the correlation and the remaining capacity of each expert network may include: determining the second allocation scheme based on an optimal transport algorithm and based on the correlation and the remaining capacity of the expert network.

In some embodiments, the optimal transport algorithm may be a sinkhorn algorithm.

In some embodiments, determining the data processing result based on the plurality of reinforced tokens may include: processing the plurality of reinforced tokens based on a self-attention mechanism, to obtain the data processing result.

It should be understood that modules or units of the apparatus 600 shown in FIG. 6 may correspond to the steps in the method 200 described with reference to FIG. 2. Therefore, the operations, features, and advantages described above for the method 200 are also applicable to the apparatus 600 and the modules and units included therein. For the sake of brevity, some operations, features, and advantages are not described herein again.

Figure 7:
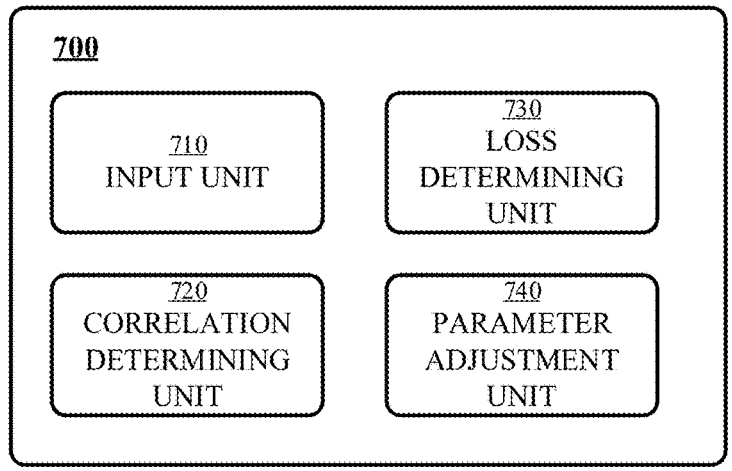
FIG. 7 is an example block diagram of an apparatus for training a data processing model according to an embodiment of the present disclosure.

FIG. 7 is an example block diagram of an apparatus for training a data processing model according to an embodiment of the present disclosure. As shown in FIG. 7, the apparatus 700 may include an input unit 710, a correlation determining unit 720, a loss determining unit 730, and a parameter adjustment unit 740. The method for training a data processing model described with reference to FIG. 4 may be performed by the data processing apparatus described in FIG. 7.

The input unit 710 may be configured to determine a sample input, where the sample input includes a plurality of tokens.

The correlation determining unit 720 may be configured to determine a correlation between each of the plurality of tokens and each of a plurality of expert networks based on a gating matrix. The plurality of expert networks are used to reinforce the plurality of tokens, and the correlation is used to allocate the plurality of tokens to the plurality of expert networks in a uniform manner with reference to a preset capacity of each expert network.

The loss determining unit 730 may be configured to determine a loss value based on the gating matrix, where greater resemblance of the gating matrix to an orthogonal matrix leads to a smaller loss value.

The parameter adjustment unit 740 may be configured to adjust a parameter of the gating matrix based on the loss value, to obtain a trained data processing model.

In some embodiments, the loss determining unit may be configured to: determine a product of the gating matrix and a transposed matrix of the gating matrix; and determine the loss value based on an error between the product and a unit matrix.

In some embodiments, the error is a minimum mean square error.

It should be understood that modules or units of the apparatus 700 shown in FIG. 7 may correspond to the steps in the method 400 described with reference to FIG. 4. Therefore, the operations, features, and advantages described above for the method 400 are also applicable to the apparatus 700 and the modules and units included therein. For the sake of brevity, some operations, features, and advantages are not described herein again.

Although specific functions are discussed above with reference to specific modules, it should be noted that the functions of the various units discussed herein may be divided into a plurality of units, and/or at least some functions of the plurality of units may be combined into a single unit.

It should be further understood that, various technologies may be described herein in the general context of software and hardware elements or program modules. The above units described with reference to FIG. 6 and FIG. 7 may be implemented in hardware or hardware combined with software and/or firmware. For example, these units may be implemented as computer program code/instructions configured to be executed in one or more processors and stored in a computer-readable storage medium. Alternatively, these units may be implemented as hardware logic/circuitry. For example, in some embodiments, one or more of the units 610 to 640 and the units 710 to 740 may be implemented together in a system on chip (SoC). The SoC may include an integrated circuit chip (which includes a processor (e.g., a central processing unit (CPU), a microcontroller, a microprocessor, and a digital signal processor (DSP)), a memory, one or more communication interfaces, and/or one or more components in other circuits), and may optionally execute a received program code and/or include an embedded firmware to perform functions.

According to another aspect of the present disclosure, an electronic device is further provided, including: at least one processor; and a memory communicatively connected to the at least one processor, where the memory stores instructions executable by the at least one processor, and the instructions, when executed by the at least one processor, cause the at least one processor to perform the method according to the embodiments of the present disclosure.

According to another aspect of the present disclosure, a non-transitory computer-readable storage medium storing computer instructions is provided, where the computer instructions are used to cause a computer to perform the method according to the embodiments of the present disclosure.

According to another aspect of the present disclosure, a computer program product is provided, including a computer program, where when the computer program is executed by a processor, the method according to the embodiments of the present disclosure is implemented.

In the technical solutions of the present disclosure, collection, storage, use, processing, transmission, provision, disclosure, etc. of user personal information involved all comply with related laws and regulations and are not against the public order and good morals.

According to an embodiment of the present disclosure, an electronic device, a readable storage medium, and a computer program product are further provided.

Figure 8:
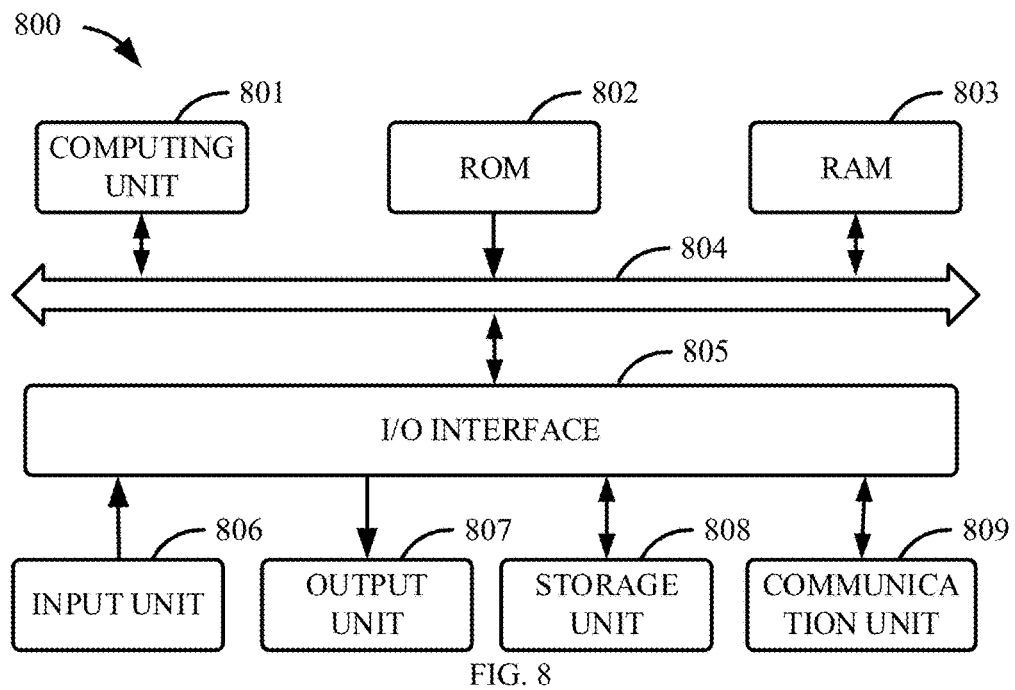
FIG. 8 is a block diagram of a structure of an example electronic device that can be used to implement an embodiment of the present disclosure.

Referring to FIG. 8, a block diagram of a structure of an electronic device 800 that can serve as a server or a client of the present disclosure is now described, where the electronic device is an example of a hardware device that can be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown in the present specification, their connections and relationships, and their functions are merely examples, and are not intended to limit the implementation of the present disclosure described and/or required herein.

As shown in FIG. 8, the electronic device 800 includes a computing unit 801. The computing unit may perform various appropriate actions and processing according to a computer program stored in a read-only memory (ROM) 802 or a computer program loaded from a storage unit 808 to a random access memory (RAM) 803. The RAM 803 may further store various programs and data required for an operation of the electronic device 800. The computing unit 801, the ROM 802, and the RAM 803 are connected to each other via a bus 804. An input/output (I/O) interface 805 is also connected to the bus 804.

A plurality of components in the electronic device 800 are connected to the I/O interface 805, including: an input unit 806, an output unit 807, a storage unit 808, and a communication unit 809. The input unit 806 may be any type of device that can input information to the electronic device 800. The input unit 806 may receive input digit or character information and generate key signal input related to user setting and/or function control of the electronic device, and may include but is not limited to a mouse, a keyboard, a touchscreen, a track pad, a trackball, a joystick, a microphone, and/or a remote controller. The output unit 807 may be any type of device that can present information, and may include but is not limited to a display, a speaker, a video/audio output terminal, a vibrator, and/or a printer. The storage unit 808 may include but is not limited to a disk or an optical disc. The communication unit 809 allows the electronic device 800 to exchange information/data with another device via a computer network such as the Internet and/or various telecommunication networks, and may include but is not limited to a modem, a network card, an infrared communication device, a wireless communication transceiver, and/or a chipset, such as a Bluetooth™ device, an 802.11 device, a Wi-Fi device, a WiMax device, and/or a cellular communication device.

The computing unit 801 may be any general-purpose and/or dedicated processing component with processing and computing capabilities. Some examples of the computing unit 801 include but are not limited to a central processing unit (CPU), a graphics processing unit (GPU), various dedicated artificial intelligence (AI) computing chips, various computing units that run machine learning model algorithms, a digital signal processor (DSP), any appropriate processor, controller, and microcontroller. The computing unit 801 performs various methods and processes described above, for example, the methods 200 and 400. For example, in some embodiments, the methods 200 and 400 may be implemented as computer software programs, which may be tangibly included in a machine-readable medium, for example, the storage unit 808. In some embodiments, some or all of the computer programs may be loaded and/or installed onto the electronic device 800 via the ROM 802 and/or the communication unit 809. When the computer program is loaded onto the RAM 803 and executed by the computing unit 801, one or more steps of the methods 200 and 400 described above may be performed. Alternatively, in another embodiment, the computing unit 801 may be configured to perform the methods 200 and 400 in any other proper manner (for example, by using firmware).

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: implementation in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user can provide an input to the computer. Other categories of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communication network) in any form or medium. Examples of the communication network include: a local area network (LAN), a wide area network (WAN), the Internet, and a blockchain network.

A computer system may include a client and a server. The client and the server are generally far away from each other and usually interact through a communication network. A relationship between the client and the server is generated by computer programs running on respective computers and having a client-server relationship with each other. The server may be a cloud server, a server in a distributed system, or a server combined with a blockchain.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure can be achieved, which is not limited herein.

Although the embodiments or examples of the present disclosure have been described with reference to the accompanying drawings, it should be appreciated that the method, system, and device described above are merely example embodiments or examples, and the scope of the present invention is not limited by the embodiments or examples, but defined only by the granted claims and the equivalent scope thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A data processing method, comprising:
   determining input data, wherein the input data includes text or image data comprising a plurality of tokens;
   determining a correlation between each of the plurality of tokens and each of a plurality of expert networks deployed on one or more servers based on a gating matrix, wherein the plurality of expert networks are used to reinforce the plurality of tokens;
   allocating the plurality of tokens to the plurality of expert networks in a uniform manner based on the correlation and a preset capacity of each expert network, to reinforce the plurality of tokens, wherein a first expert network and a second expert network of the plurality of expert networks have different preset capacity;
   determining a data processing result based on the plurality of reinforced tokens;
   wherein the gating matrix is determined by: determining loss value based on the gating matrix, wherein greater resemblance of the gating matrix to an orthogonal matrix leads to a smaller loss value; and
   adjusting a parameter of the gating matrix based on the loss value, and
   wherein the allocating the plurality of tokens to the plurality of expert networks in a uniform manner based on the correlation and the preset capacity of each expert network comprises: determining a first allocation scheme based on the correlation, wherein in the first allocation scheme, each token is allocated to an expert network having a highest correlation with the token;
      determining a remaining capacity of each expert network based on the first allocation scheme and the preset capacity of each expert network;
      and determining a second allocation scheme based on the correlation and the remaining capacity of each expert network, wherein the second allocation scheme is combined with the first allocation scheme to allocate the plurality of tokens to the plurality of expert networks in the uniform manner.

2. The data processing method according to claim 1, wherein the determining a correlation between each of the plurality of tokens and each of a plurality of expert networks based on a gating matrix comprises: determining the correlation between each of the plurality of expert networks and each of the plurality of tokens based on a product of the input data and the gating matrix.

3. The data processing method according to claim 1, wherein the determining a second allocation scheme based on the correlation and the remaining capacity of each expert network comprises: determining the second allocation scheme based on an optimal transport algorithm and based on the correlation and the remaining capacity of the expert network.

4. The data processing method according to claim 3, wherein the optimal transport algorithm is a sinkhorn algorithm.

5. The data processing method according to claim 1, wherein the determining a data processing result based on the plurality of reinforced tokens comprises:
   processing the plurality of reinforced tokens based on a self-attention mechanism, to obtain the data processing result.

6. A data processing method implemented by a data processing model model comprising a routing layer, an expert network layer comprising a plurality of expert networks, and an output layer, the method comprising:
   determining, by the routing layer, a correlation between each of a plurality of tokens in input data including text or image data and each of a plurality of expert networks deployed on one or more servers based on a gating matrix, wherein the correlation is used to allocate the plurality of tokens to the plurality of expert networks in a uniform manner with reference to a preset capacity of each expert network, and wherein a first expert network and a second expert network of the plurality of expert networks have different preset capacity;
   reinforcing, by the expert network in the expert network layer, an allocated token;
   determining, by the output layer, a data processing result based on the plurality of reinforced tokens;
   wherein the data processing model is trained by: determining a loss value based on the gating matrix, wherein greater resemblance of the gating matrix to an orthogonal matrix leads to a smaller loss value; and
   adjusting a parameter of the gating matrix bgased on the loss value, to obtain a trained data processing model, and wherein allocating the plurality of tokens to the plurality of expert networks in the uniform manner comprises:
   determining a first allocation scheme based on the correlation, wherein in the first allocation scheme, each token is allocated to an expert network having a highest correlation with the token;
   determining a remaining capacity of each expert network based on the first allocation scheme and the preset capacity of each expert network; and
   determining a second allocation scheme based on the correlation and the remaining capacity of each expert network, wherein the second allocation scheme is combined with the first allocation scheme to allocate the plurality of tokens to the plurality of expert networks in the uniform manner.

7. The data processing model according to claim 6, wherein determining the correlation between each of the plurality of tokens and each of the plurality of expert networks based on the gating matrix comprises: determining the correlation between each of the plurality of expert networks and each of the plurality of tokens based on a product of the input data and the gating matrix.

8. The data processing model according to claim 6, wherein the determining a second allocation scheme based on the correlation and the remaining capacity of each expert network comprises: determining the second allocation scheme based on an optimal transport algorithm and based on the correlation and the remaining capacity of the expert network.

9. The data processing model according to claim 8, wherein the optimal transport algorithm is a sinkhorn algorithm.

10. The data processing model according to claim 6, wherein the output layer is configured to: process the plurality of reinforced tokens based on a self-attention mechanism, to obtain the data processing result.

11. A method for training the data processing model, comprising:
 determining a sample input, wherein the sample input includes text or image data comprising a plurality of tokens;
 determining a correlation between each of the plurality of tokens and each of a plurality of expert networks deployed on one or more servers based on a gating matrix, wherein the plurality of expert networks are used to reinforce the plurality of tokens, and the correlation is used to allocate the plurality of tokens to the plurality of expert networks in a uniform manner with reference to a preset capacity of each expert network, and wherein a first expert network and a second expert network of the plurality of expert networks have different preset capacity;
 determining a loss value based on the gating matrix, wherein greater resemblance of the gating matrix to an orthogonal matrix leads to a smaller loss value; and
 adjusting a parameter of the gating matrix based on the loss value, to obtain a trained data processing model,
 wherein allocating the plurality of tokens to the plurality of expert networks in a uniform manner based on the correlation and the preset capacity of each expert network comprises:
 determining a first allocation scheme based on the correlation, wherein in the first allocation scheme, each token is allocated to an expert network having a highest correlation with the token;
 determining a remaining capacity of each expert network based on the first allocation scheme and the preset capacity of each expert network; and
 determining a second allocation scheme based on the correlation and the remaining capacity of each expert network, wherein the second allocation scheme is combined with the first allocation scheme to allocate the plurality of tokens to the plurality of expert networks in the uniform manner.

12. The method according to claim 11, wherein the determining a loss value based on the gating matrix comprises: determining a product of the gating matrix and a transposed matrix of the gating matrix; and determining the loss value based on an error between the product and a unit matrix.

13. The method according to claim 12, wherein the error is a minimum mean square error.

14. An electronic device, comprising:
 at least one processor; and a memory communicatively connected to the at least one processor, wherein the memory stores instructions executable by the at least one processor, and the instructions, when executed by the at least one processor, cause the at least one processor to perform the method according to claim 1.

15. A non-transitory computer-readable storage medium storing computer instructions, wherein the computer instructions are used to cause a computer to perform the method according to claim 1.

16. A computer program product, comprising a computer program and a processor, wherein when the computer program is executed by the processor, the method according to claim 1 is implemented.

* * * * *